United States Patent Office 3,123,539
Patented Mar. 3, 1964

3,123,539
PROCESS FOR RECOVERING CATALASE FROM
THE CELLS OF *MICROCOCCUS LYSODEIKTICUS*
Roland F. Beers, Jr., 1406 Carrolton Ave., Ruxton 4, Md.
No Drawing. Filed Nov. 20, 1962, Ser. No. 239,083
5 Claims. (Cl. 195—66)

This invention relates to a method for recovering catalase from bacterial sources thereof. More particularly the invention relates to an improved process for the recovery of high yields of bacterial catalase from the cells of *Micrococcus lysodeikticus*. This application is a continuation in part of my copending application Serial No. 35,464, filed June 13, 1960, and now abandoned.

It has been known, heretofore, that catalase may be obtained from various vegetable and animal sources. However, catalase so recovered frequently contains undesirable contaminating materials, among which may be chlorophyll coloring matter when vegetable sources are extracted and hemoglobin coloring compounds when animal sources (such as liver tissue, etc.) are processed.

The previously disclosed processes for the recovery of catalase from animal and vegetable sources have also been subject to certain other disadvantages. In addition to the contaminants above mentioned, the yields of catalase were frequently low. Usually the extraction processes necessitated the use of expensive solvents and filtration and evaporation techniques which had the added disadvantage of being excessively expensive for commercial purpose. This is particularly true with the extraction of catalase from liver as described in U.S. Patent No. 2,834,713, issued May 13, 1958, to Kenneth C. Robbins.

It has now been found that by carrying out the process of this invention and utilizing as a preferred source of catalase the cells of *Micrococcus lysodeikticus* as prepared and harvested in accordance with the procedure described in U.S. Patent No. 2,966,445, issued December 27, 1960, to Roland F. Beers, Jr., much higher yields of catalase can be obtained by a more efficient and economical process than was heretofore possible. The catalase so recovered is also found to be more active than that obtained from other sources.

In accordance with the present invention the preferred process for the recovery of catalase described in more detail below may be summarized in the following steps: (1) a lysing of the cells of *Micrococcus lysodeikticus* produced in accordance with the above mentioned U.S. Patent No. 2,966,445; (2) a fractionation of the lysate by centrifugation of a mixture of the lysate, a suitable organic solvent and a salt present in a minimum concentration, for the separation of inert bacterial material from the liquid medium containing soluble catalase; and finally, (3) a precipitation of the dissolved catalase from solution.

In order to carry out the recovery process of this invention, a suspension of cells of *Micrococcus lysodeikticus* is first prepared as described in the above cited patent, U.S. Patent No. 2,966,445. These cells are harvested or recovered from the fermentation beer preferably by centrifugation. Alternatively, the cells may be harvested by filtration, but the complexities inherent in a filtration process such as those introduced by the use of a filter aid militate in favor of the centrifugal harvesting step, since the tenacious adherence of the catalase to the filter aid makes recovery of the catalase difficult.

Briefly, the process of this invention for the recovery of catalase from the cells of *Micrococcus lysodeikticus* may be illustrated in a preferred embodiment by the steps comprising lysing a suspension of these cells as harvested from the process described in U.S. Patent No. 2,966,445 in a solution of 0.5% sodium chloride at a pH of about 7.0 and at a temperature of about 35° C. using 1.5% based on the wet weight of the cells (equal to about one-fifth of the dry weight of the cells) of powdered egg white as the lysing agent. Crystalline lysozyme may be used as a lysing agent if desired.

After lysing is complete 95% ethanol is added to the mixture to a concentration of 50% by volume and enough sodium chloride to increase the salt content to 1% on a weight-volume basis. This mixture is then centrifuged to remove cell debris and precipitated proteinaceous material. To the decanted supernatant centrifuged liquid is then added 95% ethanol to a concentration of 75% by volume to precipitate the catalase. This precipitate is then washed with additional ethanol until dehydrated and then dried and recovered as a fine powder.

The cells of *Micrococcus lysodeikticus* may be lysed in a solution of sodium chloride having a concentration of about from 0.5% to 2%. The sodium chloride concentration is then adjusted to about from 1% to 2% either before or after adding ethanol to a concentration of about from 40% to 50% by volume. Potassium chloride may be used alternatively to sodium chloride in the fractionation step but not in the lysing step. The most critical step of the entire process is adjusting the salt concentration to one in the range of about from 1% to 2% for the fractionation, for if the indicated concentration of sodium chloride is not achieved, fractionation of the lysate cannot be readily accomplished by ordinary centrifugation means.

For the precipitation of the dissolved catalase there is added 95% ethanol to a concentration of about from 70% to 85% by volume. It has been found that using upwards of 75% by volume of 95% ethanol results in the formation of a drier precipitation which is easier to handle.

The overall manipulations used in carrying out the process of this invention may be varied in many different ways so long as the above described conditions are met. For example, the lysing step may be conducted at any temperature from room temperature to 45° C., with a temperature of 35° C. being especially preferred as pointed out above. The pH of the slurry of the cells in the sodium chloride is held between pH 6.0 and pH 9.0, preferably between pH 6.5 and pH 7.5. The lysing agent may be used in any concentration which will effect the lysing of the cells. For this purpose the indicated concentration of about one-fifth the dry weight of the cells is preferred. The duration of the lysing step is not critical but is preferably extended just beyond the period when the lysed cells adhere to the surface of a glass rod immersed in the solution.

Various procedures may be utilized in carrying out the process of this invention. For example, the cells of *Micrococcus lysodeikticus* may be lysed at 0.5% sodium chloride concentration, ethanol added and the resulting mixture brought to a 1% to 2% sodium chloride concentration for fractionation. In another embodiment the cells may be lysed at 0.5% sodium chloride concentration and sodium chloride then added to a 2% concentration followed by the addition of ethanol for fractionation. In still another embodiment the cells may be lysed at 2% sodium chloride concentration and ethanol added to effect the fractionation.

The essential character of the process, as pointed out above, resides in the sodium chloride concentration being adjusted to 1% to 2% at the time of fractionation.

The following examples are illustrative and not limitative of the process herein disclosed:

Example I

Ninety-five pounds of *Micrococcus lysodeikticus* cells (wet weight) were slurried in 0.5% sodium chloride at a concentration of approximately 5% by dry weight. The pH was adjusted to 6.9 with potassium hydroxide and the temperature to 35° C. 1.5 pounds of dried egg white (lysozyme source) were added and the mixtures stirred. Lysis of the cells was complete in 20 minutes. An equal volume of 95% ethanol was added and the mixture stirred. The solution was then passed through a Tolhurst solid basket centrifuge but the separation of the gelatinous mass from the liquid phase containing the catalase was unsuccessful. The concentration of sodium chloride was increased to 1.5% by the addition of solid sodium chloride and the separation was successful. The liquid phase was brought to 75% with respect to ethanol and filtered through a press, washed first with 95% ethanol and then with absolute ethanol and dried. Yield of solids was 1000 grams containing approximately 5% catalase.

Example II

Ninety-five pounds of *Micrococcus lysodeikticus* cells were suspended in 0.5% sodium chloride, the pH adjusted to 7.0 and the temperature to 35° C. The final concentration of cells was 5.0% by dry weight. 1.5 pounds of dried egg whites were added and the mixture stirred. Lysis was complete in 20 minutes. An equal volume of 95% ethanol was added to the mixture after the sodium chloride concentration was increased to 2%. Separation of the gelatinous mass from the liquid phase was successfully accomplished in the Tolhurst centrifuge. The catalase was precipitated by adding 95% ethanol to a concentration of 75%. The precipitated catalase was washed first with 95% ethanol, then with absolute ethanol and dried. The final yield of solids was 1,500 grams containing approximately 5% catalase.

In summary, this invention describes a process for the recovery of catalase from cells of *Micrococcus lysodeikticus* which consists of the steps of lysing the cells, fractionating the lysate by centrifugation using a mixture of ethanol and sodium chloride in which the sodium chloride is present in a concentration of about from 1% to 2% and the ethanol concentration is about from 40% to 50% and finally precipitating the catalase from solution by the addition of ethanol in a concentration of about from 70% to 85%.

What is claimed is:
1. A process for recovering catalase from the cells of *Micrococcus lysodeikticus* which comprises:
   (1) lysing a suspension of the cells in a sodium chloride solution containing a lysing enzyme,
   (2) fractionating the resulting lysate by centrifugation of a mixture of the lysate with ethanol in a concentration of 40% to 50% by volume calculated as 95% ethanol and a member selected from the group consisting of sodium chloride and potassium chloride in a concentration of about from 1% to 2% by weight, and,
   (3) precipitating the dissolved catalase from solution by addition of ethanol to a concentration of about from 70% to 85% by volume calculated as 95% ethanol.

2. A process according to claim 1 wherein the cells are lysed at a concentration of 0.5% sodium chloride, ethanol is added and the resulting mixture brought to a concentration of 1% to 2% sodium chloride for fractionation.

3. A process according to claim 1 in which the cells are lysed at 0.5% sodium chloride concentration, sodium chloride is then added to a concentration of 2% and ethanol then added for fractionation.

4. A process according to claim 1 wherein the cells are lysed at a concentration of 2% sodium chloride and ethanol added to effect the fractionation.

5. A process for recovering catalase from the cells of *Micrococcus lysodeikticus* which comprises:
   (1) lysing a suspension of the cells in a sodium chloride solution containing a lysing enzyme,
   (2) precipitating the lysed cells and proteinaceous material by adding alcohol to a concentration of about from 40% to 50% by volume and adjusting sodium chloride concentration to about from 1% to 2% by weight, and,
   (3) precipitating the catalase from the supernatant liquid by adding alcohol to a concentration of about from 70% to 85% by volume.

References Cited in the file of this patent

UNITED STATES PATENTS 2,834,713    Robbins _____ May 13, 1958

OTHER REFERENCES

Herbert et al.: Article in Biochemical Journal, vol. 43, pp. 193 to 202, London, 1948.

Chemical Abstract, vol. 49, 7046b (1955).